Nov. 14, 1961    C. L. BRUNOW ET AL    3,008,376
LAUNCHING DEVICE

Filed Oct. 24, 1957    2 Sheets-Sheet 1

INVENTORS
CHARLES L. BRUNOW
ALBERT L. DUNN &
RICHARD R. PITTS
BY Raymond Wooten
ATTORNEY

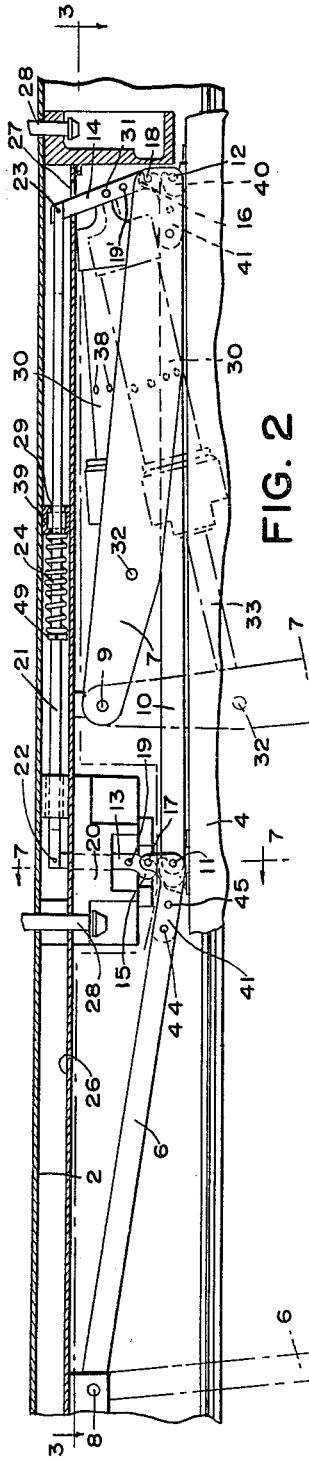

United States Patent Office 3,008,376
Patented Nov. 14, 1961

3,008,376
LAUNCHING DEVICE
Charles L. Brunow and Albert L. Dunn, Dallas, and Richard R. Pitts, Arlington, Tex., assignors, by mesne assignments, to Temco Electronics & Missiles Company, Dallas, Tex., a corporation of Delaware
Filed Oct. 24, 1957, Ser. No. 692,156
9 Claims. (Cl. 89—1.5)

This invention relates to devices for launching rockets, bombs, missiles, targets or other projectiles from aircraft and is more particularly directed to launchers of the extendable and retractable type.

It is current practice to provide certain military aircraft with bombs, torpedoes, missiles or rockets carried by a launcher entirely or partially within a bomb bay so as to reduce the drag exerted by such armament, or externally mounted on wings or body for optimization of load carrying capability of the aircraft. The launcher, when operated, displaces the armament from its initial carrying position to a launching position free of the confines of the aircraft or displaced from the disturbed flow field around the aircraft wing or fuselage, and thus permits safe release of the armament without danger of fouling the undercarriage, propeller or other parts of the aircraft or of the armament being released. The projectile is restrained throughout the catapult operation, being released at the end of the catapult travel at a predetermined attitude. Rockets and bombs of recent design are larger than those of earlier design. In some instances, the projectiles carried for release are extremely large and may differ from conventional armament, as when a winged missile, target drone or small plane is carried aloft for launching by a larger plane. In this specification, the objects to be launched from a plane shall, regardless of their character, be referred to hereinafter, as projectiles.

It is a primary objective of this invention to provide a launching device suitable for projectiles of varying types and which will assure positive retention of the projectile internally or externally of an aircraft until release of the projectile is desired.

It is a further objective of the invention to provide an extendable and retractable launching device which will catapult the projectile from a rest position, in which it is locked, directly into a launching position, displaced from the aircraft but in line with the intended flight of the projectile and from which it may be safely released, and to impart a forward relative velocity to the projectile at the time of release, the launcher returning immediately after release of the projectile to its initial retracted position.

Still another objective of the invention lies in the provision of a launcher having few parts of relatively simple construction whereby the device may be easily fabricated and assembled in an inexpensive manner.

The novel features that are considered characteristic of the invention are set forth with particularity in the appended claims. The invention itself, however, both as to its organization and its method of operating together with additional objects and advantages thereof, will best be understood from the following description of specific embodiments when read in connection with the accompanying drawing, wherein like reference characters indicate like parts throughout the several figures and in which:

FIG. 2 is an enlarged fragmentary view, partially in vertical section and partially in elevation, taken centrally and longitudinally of the retracted launcher and showing certain parts in dotted lines when in their extended positions;

FIG. 3 is a top plan view taken along line 3—3 of FIG. 2;

FIG. 4 is a side elevation of the launcher actuator partially in section and illustrating the extended position in dotted lines;

Figure 1:
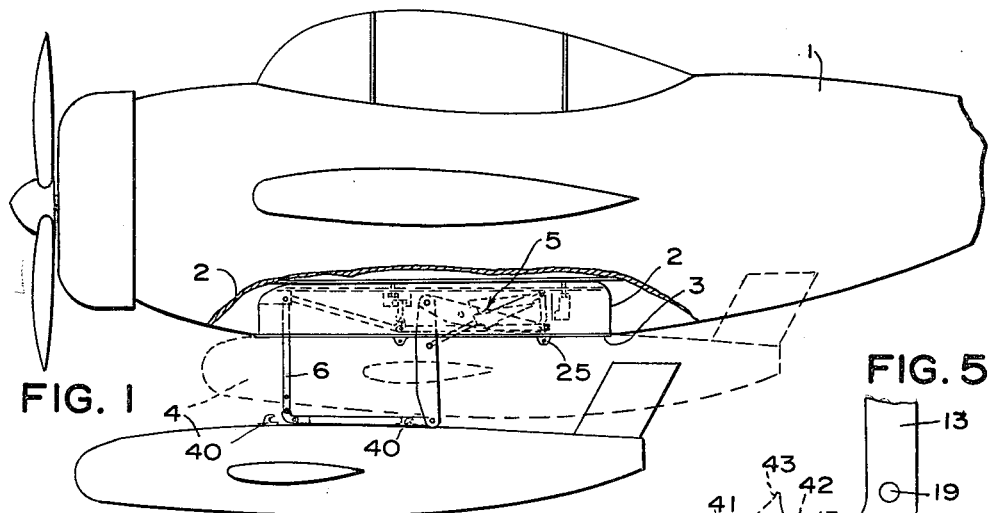
FIG. 1 is a view in side elevation of an airplane partially broken away to show a launcher according to one form of the invention at the moment of releasing a target drone and illustrating the retracted launcher and drone in dotted lines.

Referring now specifically to FIGS. 1, 2, 3 and 7, there is illustrated an airplane 1 provided with an inverted trough-like bay 2 firmly fastened in the underpart of its fuselage. Snugly fitted partially within the bay 2 and closing its open under side 3 is a target drone 4. The drone 4 is a self-powered, radio-guided small plane which is carried aloft by the plane 1 and supported thereon by a launching device 5. Ground adjustable sway braces 25 prevent lateral motion or roll of the drone 4 in the carrying position. Upon reaching a desired elevation and point in space, the pilot of the plane 1 actuates the launcher 5 to release the drone 4 in a selected direction and to follow a subsequent radio-directed target path under its own power, while shots are fired at the drone in target practice.

The launcher 5 comprises a pair of catapult arms 6 and 7, each of which is pivotally supported at its inner end, within the bay 2, on pins 8 and 9 respectively. The outer ends of the arms 6 and 7 are joined by a bar 10 secured on the pivot pins 11 and 12. A pair of interconnected locking members 13 and 14 having hooked ends 15 and 16 respectively, which engage the pins 17 and 18 on the catapult arms 6 and 7, serve to securely hold the trapeze-like launcher arms 6, 7 and 10 in retracted positions within the bay. The locking member 13 is pivotally supported on a pin 19 which passes through a strengthened frame portion 20 of the bay 2, which is, in turn, fixedly secured to the air frame by means of suitable support rods 28. The locking member 14 is similarly pivotally supported on a pin 19' carried by the frame. The bifurcated upper ends of the locking levers 13 and 14 are linked by a rod 21 having bifurcated ends secured over pivots 22 and 23. A coil spring 24 biases the locking levers 13 and 14 to their locking positions shown in FIG. 2. The rod 21 slides through loose guide openings 29 in a bracket 39 fastened to the upper wall of the bay 2 and a lower ceiling element 26. A spring 24 is compressed between a bracket 39 and a collar 49 fastened to the rod 21. Both locking members 13 and 14 pass through slots 27 in the lower ceiling element 26 of the bay 2 which permits limited turning movement of the locking members.

The launcher actuator comprises an explosive charge firing cylinder 30 pivotally secured to the locking lever 14 by means of a pin 31. The other end of the cylinder is attached to the catapult arm 7, being secured by means of a pivot bolt 32 passing through an opening in the end of a piston rod 33. As best shown in FIG. 4, an explosive charge 35 is seated within the cylinder 30. The piston 36 is urged against the end of the cylinder 30 by the coil spring 37. To enable insertion of the explosive charge, the cylinder 30 is made of separable portions secured by any suitable means such as bayonet joints, not shown. The explosive charge is preferably fired by the passage of an electric current through lead-in wires 34 diagrammatically shown. Explosion of the powder in the charge 35 releases an expanding gas which forces the piston 36 and rod 33 to the left, as viewed in FIG. 4, compressing the spring 37 until the piston uncovers the vents 38 in the wall of the cylinder 30. Shortly thereafter, the pressure of the exploded gas in the right side of cylinder 30 will have decreased by venting to a level lower than that of the compressed spring 37 and air in the left side of the cylinder, whereupon the piston 36 will be quickly forced to the right and back to its original position before firing of the charge.

Figure 7:
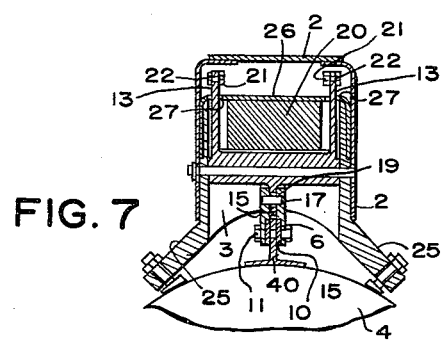
FIG. 7 is a vertical enlarged section taken on line 7—7 of FIG. 2.
Figure 5:
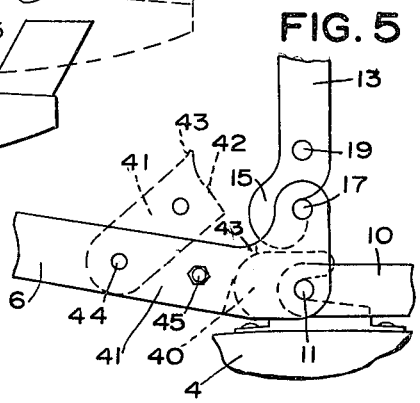
FIG. 5 is a fragmentary side elevation showing one of the launcher locking assemblies in retracted position.
Figure 6:
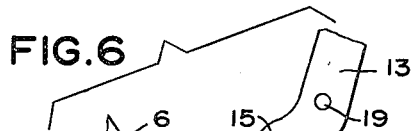
FIG. 6 is a view similar to FIG. 5 showing the locking assembly at a time when the launcher is partially extended.

Referring to FIGS. 5, 6 and 7, there is shown a hook-like support lug 40 of substantially U-shape having one leg secured to the upper surface of the target drone 4. The open portion of the lug faces rearwardly of the target drone so that its free leg or hook is disposed over the pivot 11 which secures the catapult arm 6 to the rod 10. The support lug 40 and attached drone 4 are securely locked in position on the pin 11, upward movement being prevented by the end 15 of the locking member 13, and forward movement being prevented by a latch member 41 whose end surface 42 terminates in a rounded heel 43 which bears against the front of the lug 40. Rearward movement of the lug 40 is, of course, prevented by the pin 11. To enable loading of the target drone 4, the latch member 41 may be swung counterclockwise on the pin 44 as shown in broken lines in FIG. 5, the bolt 45 having been removed. After loading, the latch member 41 is rotated clockwise into its position illustrated in FIG. 5, and the bolt 45 is inserted to secure the latch member in fixed relationship to the arm 6. Two similar side-by-side support lugs 40 at the rear of drone 4, are provided with similar latching members 41 to secure them to pivot pin 12 at the rear end of rod 10. When the launching arms 6 and 7 have been angularly rotated approximately 45° toward their extended launching positions, the locking levers 13 and 14 will have been released and separated from the launching arms 6 and 7, respectively, and the arms 6, 7 and 10, including the fixed latch members 41, will have rotated about the lug 40 to the position shown in FIG. 6, which frees the lugs 40 and the supported drone to be ejected forwardly from the supporting launcher arms. The two side-by side support lugs 40, at the rear of the drone 4, additionally prevent lateral motion and roll of the drone during the launching motion and until the drone is released, as indicated in FIG. 1.

The described embodiment of the invention operates in the following manner:

The projectile 4 is loaded on the launcher so that the supporting lugs 40 are locked in place by the positioning of the launcher arms 6 and 7, the rod 10, the levers 13 and 14, and the latches 41 described. The projectile is then secured by tightening the ground adjustable sway braces 25. The spring biased locking members 13 and 14 prevent extension of the launcher arms 6 and 7. The plane 1 is then flown to a desired releasing point while carrying the drone 4 snugly and securely against and partly within the bay 2. When the pilot desires to release the drone 4, he energizes the explosive charge 35 causing it to explode. The resulting expanding gas acts quickly to force the piston 36 toward the left, as viewed in FIG. 2, but first the reaction force within the cylinder 30 rotates the locking lever 14 about the pivot 19' to release the lever. At the same time, the link bar 21 moves to the right, releasing the locking lever 13. This permits the arms 6 and 7 to be thrust towards their extended positions under the action of the piston 36 and the rod 33. When the arms 6 and 7 have rotated approximately 45° toward their extended launching positions, the latch members 41 will have rotated to clear the drone support lugs 40, as will be seen from FIG. 6. However, the rapid acceleration of the arms 6 and 7 will retain these lugs in their supported condition on pins 11 and 12 until the arms have rotated approximately 75°, or to the limit of their extension, as shown in broken lines in FIG. 2. At this time, the explosive gases will have discharged through the vents 38 in the cylinder 30 and the arms 6 and 7 will start quickly back, turning toward their original positions under the force of the coil spring 37 acting on the piston 36 in the cylinder 30. When the arms 6 and 7 return to their initial retracted positions, they will be locked automatically therein by striking against the rounded bottoms of the hooked ends 15 and 16 of the locking levers 13 and 14 which have already returned to their locking positions under the biasing influence of the spring 24. The force of this striking action will deflect the locking levers 13 and 14 against the force of the spring 24 sufficiently to enable the hooked ends of the levers to engage over the pins 17 and 18.

Figure 8:
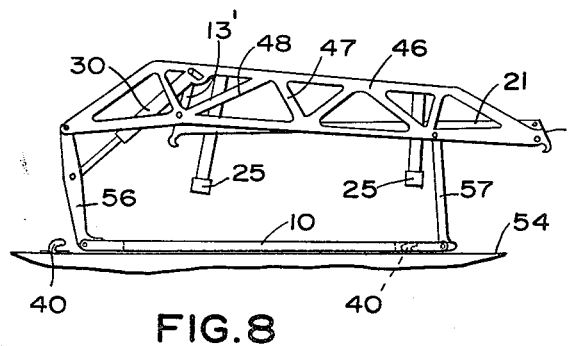
FIG. 8 is a side elevation of a modified launcher adapted to carry and launch a projectile.

A modified launcher, shown in FIG. 8, is adapted to carry and eject a large rocket 54. In this embodiment, the launcher is provided with a rigid frame 46 suitably braced by truss elements 47 and 48 and carrying ground adjustable sway braces 25 to prevent lateral motion and roll of the rocket. The frame and attached rocket are normally carried within a bomb bay, or they may be externally mounted on the wings or body of the plane. The catapult arms 56 and 57, linked by the rod 10, the locking members 13' and 14', and the other moving elements of the launcher, are the same or similar to those previously described, except that the actuating cylinder 30 is connected to the forward catapult arm 56 rather than to the rear arm 57, as shown. The launcher illustrated in FIG. 8 operates in a manner identical to that described with reference to FIGS. 1 to 7.

It will be apparent from the described operation that a number of advantageous characteristics are inherent in the construction of the invention. The projectile to be launched is securely locked and safely carried in the launcher until ready to be ejected. When the projectile is self-powered and actuated by electrical energy from an external source, umbilical connections of the plug-in type may be made from the launcher to the projectile, which connections will separate when the projectile is released. The projectile may be jettisoned by operating the launcher without utilizing propulsive force contained in the projectile. The formation of ice on the plane or launcher mechanism is no deterrent to successful launching of the projectile as the catapulting force is sufficient to break such ice from the structure. The launcher may be mounted to carry projectiles externally on the wing or body or entirely within the wing, fuselage or body of the carrier plane. Doors necessary to present a smooth skin surface to external air or water may be linked to the launcher so as to be opened and closed by its mechanism. If desired, the launcher propulsive energy may be supplied by the pressure of oil or other fluid in an actuator cylinder rather than by an explosive charge. In such cases, a linkage system may be added to automatically reverse the fluid pressure just before the outer limit of piston travel during launching to decelerate the catapult arms and initiate their return to the retracted position.

Although specific embodiments of the invention have been shown and described, it will be obvious to those skilled in the art that many modifications are possible.

What is claimed and desired to be secured by Letters Patent is:

1. In combination with an aircraft, an extendable and retractable launching device for supporting and launching a projectile, said launching device comprising: a frame; catapult arm means pivoted at one end to said frame and having projectile support means fixed to said arm means at the other end; locking means, movably carried by said frame, provided with means for releasably engaging and holding said arm means in retracted position relative to said frame; and driving means including one element connecting said arm means and another element connecting said locking means and operable, when actuated, for releasing said locking means and for catapulting said arm means to the extended launching position.

2. The combination according to claim 1 wherein said driving means for catapulting the arm means to extended launching position comprises an expansible motor having a cylinder element and a piston element, one of said elements being pivotally attached to said locking means, and the other element being pivotally attached to said catapult arm means, and means for driving said piston within the cylinder.

3. The combination described in claim 1 wherein said driving means for catapulting the arm means to extended launching position comprises a cylinder and piston therein, and an explosive charge in said cylinder for explosively driving said piston in one direction.

4. The combination as described in claim 1 wherein said driving means for catapulting the arm means to extended launching position comprises a cylinder element and a piston element having opposed surfaces therein, one of said elements being attached to said locking means and the other of said elements being attached to said arm means, an explosive charge in said cylinder exposed to one of said surfaces for explosively driving said piston in one direction, vents in said cylinder for exhausting the explosive gas close to a desired limit of piston travel in said one direction and a spring in said cylinder in combination with compressed fluid exposed to the other of said surfaces for driving the piston in the opposite direction.

5. The combination according to claim 1 wherein said locking means is biased to hold said catapult arm means in its retracted position and said driving means for catapulting said arm means to extended launching position includes means for returning said arm means to its retracted position to reengage said biased locking means.

6. The combination described in claim 1 wherein said locking means is pivotally carried by said frame, said driving means for catapulting the arm means to extended launching position comprises a cylinder pivotally secured to said locking means for retracting said locking means and releasing said catapult arm means upon movement of the cylinder in one direction, a spring biasing said locking means to its locking position, a piston in said cylinder pivotally connected to said catapult arm means, and means for driving said piston in both directions axially of said cylinder.

7. A device for launching from an aircraft a projectile having rearwardly directed support lugs of hooked form, comprising a frame, a pair of catapult arms mounted in tandem and each having an inner end pivoted to said frame, a bar joining the ends of said catapult arms remote from said inner ends and secured to pivots thereon, a pair of locking members movably connected to said frame, means interconnecting said locking members, said locking members being cooperable with said remote ends of the catapult arms to releasably hold the arms in retracted position, force producing means connected with said locking members and catapult arms for releasing said locking members and turning said catapult arms to an extended launching position, the said pivots at the remote ends of the catapult arms being also adapted to support the projectile by rotative engagement with said lugs, and means carried by said arms engaging said lugs when said arms are retracted to secure the projectile support lugs against displacement.

8. A launching device according to claim 7 wherein said catapult arms are additionally provided with latch members which bear against said projectile support lugs while the catapult arms are in locked retracted position and continue to bear against said lugs to prevent displacement of the projectile during a desired portion of the turning movement of said catapult arms toward extended launching position.

9. A launching device according to claim 7 wherein said catapult arms are additionally provided with latch members which bear against said projectile support lugs when the catapult arms are in retracted position and for a portion of the time during which said catapult arms are moving to extended launching position to prevent displacement of the projectile from the launching device, said latching members being movably secured to said catapult arms to permit loading of the projectile on the launching device.

References Cited in the file of this patent

UNITED STATES PATENTS

| | | |
|---|---|---|
| 2,386,839 | Bronson | Oct. 16, 1945 |
| 2,409,210 | Jolly | Oct. 15, 1946 |
| 2,466,980 | Bronson | Apr. 12, 1949 |
| 2,481,542 | Schuyler | Sept. 13, 1949 |
| 2,822,207 | Steinmetz | Feb. 4, 1958 |